(12) United States Patent
Arya et al.

(10) Patent No.: US 11,572,919 B2
(45) Date of Patent: Feb. 7, 2023

(54) CLAMP SLIDE FOR LINEAR GUIDE

(71) Applicant: HIWIN TECHNOLOGIES CORP., Taichung (TW)

(72) Inventors: Made Rama Pradipta Arya, Taichung (TW); Yeh-Wei Lin, Taichung (TW); Hsien-Yu Chen, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 152 days.

(21) Appl. No.: 17/245,800

(22) Filed: Apr. 30, 2021

(65) Prior Publication Data

US 2022/0042543 A1   Feb. 10, 2022

(30) Foreign Application Priority Data

Aug. 6, 2020   (TW) .................................. 109126732

(51) Int. Cl.
| | |
|---|---|
| *F16D 63/00* | (2006.01) |
| *F16C 29/10* | (2006.01) |
| *F16C 29/02* | (2006.01) |
| *F16D 65/18* | (2006.01) |
| *F16D 125/66* | (2012.01) |
| *F16D 121/04* | (2012.01) |

(52) U.S. Cl.
CPC .............. *F16C 29/10* (2013.01); *F16C 29/02* (2013.01); *F16D 63/008* (2013.01); *F16D 65/18* (2013.01); *F16D 2121/04* (2013.01); *F16D 2125/66* (2013.01)

(58) Field of Classification Search
CPC ........ F16C 19/02; F16C 29/10; F16D 63/008; F16D 65/18; F16D 2121/04; F16D 2125/66
See application file for complete search history.

(56) References Cited

U.S. PATENT DOCUMENTS

| | | | |
|---|---|---|---|
| 6,578,677 B2 | 6/2003 | Hsu et al. | |
| 7,124,861 B2 | 10/2006 | Maher | |
| 2005/0183907 A1* | 8/2005 | Maher ................... | F16D 65/567 188/72.7 |
| 2012/0031713 A1* | 2/2012 | Zimmer ................ | F16D 63/008 188/43 |

FOREIGN PATENT DOCUMENTS

| | | | |
|---|---|---|---|
| DE | 102009008815 B4 | 4/2011 | |
| DE | 102013009780 A1 * | 12/2014 | .............. F16C 29/10 |

OTHER PUBLICATIONS

Machine translation of DE 10 2013 009 780 (no date).*

* cited by examiner

*Primary Examiner* — Nicholas J Lane
(74) *Attorney, Agent, or Firm* — Muncy, Geissler, Olds & Lowe, P.C.

(57) ABSTRACT

A clamp slide for use in a linear guide includes a slide body, two piston units disposed in the slide body, two elastic members stopped against the piston units, and two fluid pressure cylinders pushing the piston units to move toward a direction against restoring forces exerted by the elastic members. Further, a moveable member is disposed in each of the piston units and pushed by an inclined plane of a lateral cover to push a braking member, such that a rail is clamped by the left and right braking members. The lateral cover can be assembled in different ways according to actual needs for enabling the inclined plane to perform opposite tilt direction. As such, the clamp slide of the present invention has the effects of simplifying structure and reducing cost.

9 Claims, 13 Drawing Sheets

CLAMP SLIDE FOR LINEAR GUIDE

BACKGROUND OF THE INVENTION

1. Field of the Invention

The present invention relates to a linear guide and more particularly, to a clamp slide for use in a linear guide.

2. Description of the Related Art

DE 102009008815 B4 uses a spring to apply a force to a sliding wedge, such that the sliding wedge pushes balls through its inclined plane to generate a clamping force. By this way, the sliding wedge is clamped on the rail. When an air pressure is applied to a piston, the spring is pushed by the piston to be compressed, such that the clamping force is released. However, this prior art has problems of many components, inconvenient assembly, and high manufacturing cost, and further, the air piping is arranged complicatedly, so a lot of sealing members are used to maintain proper sealing effect.

U.S. Pat. No. 7,124,861 B2 discloses similar technical features as the aforesaid prior art. A compression spring is used to apply a force to a first piston, and then the first piston drives rollers to push against an inclined plane of a wedge. Movement of the wedge provides a braking force against relative movement of a brake and a channel to stop movement of the brake relative to the guide rail. When the fluid pressure is applied to a second piston, the second piston pushes the first piston, and then the first piston pushes the compression spring, such that the braking force is released. However, this prior art has problems of many components, inconvenient assembly, and high manufacturing cost, and further, due to the limitation of the space in a housing, only two pistons can be used, resulting in lower braking force.

U.S. Pat. No. 6,578,677 B2 uses a disk spring to apply a restoring force to a braking rod, such that the braking rod extends out to enable its rough surface to make contact with a friction surface of a linear guide so as to bring about a braking effect. When a piston acts by a pneumatic/hydraulic pressure, an urging rod is pushed by the piston into an insertion slot of the braking rod, thereby causing the braking rod to retreat to compress the disk spring. However, the space used to receive the disk spring is not enough, so the braking force generated by the braking rod is insufficient under the restoring force of the disk spring. Further, since the pistons located at two opposite sides of the braking rod are arranged in a face-to-face manner, the braking rod may be twisted due to the unbalanced forces generated by the two opposite pistons, thereby affecting the braking force.

SUMMARY OF THE INVENTION

It is a primary objective of the present invention to provide a clamp slide for use in a linear guide, which can simplify structure and reduce manufacturing cost and provide an optimum clamping force.

To attain the above objective, the clamp slide of the present invention comprises a slide body, two piston units, two elastic members, two fluid pressure cylinders, and two braking units. The slide body includes two opposite lateral portions and a top portion connected with the lateral portions to form a rail groove fitted to a rail. Each of the lateral portions has a lateral hole at one side thereof back to the rail groove. Each of the piston units is movably disposed in one of the lateral portions of the slide body and provided with a transverse hole. Each of the elastic members is disposed in one of the lateral portions of the slide body and stopped against one of the piston units. Each of the fluid pressure cylinders is disposed at the end surface of one of the lateral portions of the slide body for providing a hydraulic pressure force to push one of the piston units to move toward a direction against a restoring force exerted by the elastic member. Each of the braking units includes a braking member disposed at one side, toward the rail groove, of one of the lateral portions of the slide body, a movable member movably disposed in the transverse hole of one of the piston units, and a lateral cover disposed at the lateral hole of one of the lateral portions of the slide body and having an inclined plane abutted against one of the movable members. By this way, the braking members are pushed by the movable members to clamp the rail. Further, when the lateral cover is assembled with the lateral hole in a first state, a distance between the inclined plane of the lateral cover and the rail is decreased gradually toward a direction in which the piston unit is pushed by the fluid pressure cylinder. That is to say, the rail is clamped from the braking members when the fluid pressure forces are applied by the fluid pressure cylinders, and the rail is released by the braking members when no hydraulic pressure forces are applied by the fluid pressure cylinders. When the lateral cover is assembled with the lateral hole in a second state, the distance between the inclined plane of the lateral cover and the rail is increased gradually toward a direction in which the piston unit is pushed by the fluid pressure cylinder. That is to say, the rail is released from the braking members when the fluid pressure forces are applied by the fluid pressure cylinders, and the rail is clamped by the braking members when no hydraulic pressure forces are applied by the fluid pressure cylinders.

It can be understood from the above illustration that the clamp slide of the present invention allows the inclined planes of the lateral covers to perform different tilt direction by means of changing the lateral covers in assembly way for meeting different requirements, such that the number of components can be reduced to simplify structure and reduce manufacturing cost.

Preferably, each of the lateral portions of the slide body includes a first chamber communicating with one of the lateral holes, a second chamber separated from the first chamber by a partition wall. Each of the piston units includes a first piston and a second piston. Each of the first pistons is movably disposed in one of the first chambers of the slide body and having a head portion, a body portion connected with the head portion and provided with the transverse hole, and a rod portion connected with the body portion and passing through the partition wall and having a part located in one of the second chambers of the slide body. Each of the second pistons is movably disposed in one of the second chambers of the slide body and fixedly connected with the rod portion of one of the first pistons so as to be moved along with the first piston. Further, the elastic members are stopped against the second pistons, and the fluid pressure cylinders are stopped against the first pistons.

Preferably, the moveable members each have a holder provided with two holding slots at two ends thereof, and two rolling members received in the holding slots and partially protruding out of two ends of the holder. When one of the rolling members is pushed by the inclined plane of one of the lateral covers, the other of the rolling members pushes against one of the braking members.

Preferably, the braking members each have a metal bracket mounted to the bottom side of the top portion of the slide body, a support block disposed to the metal bracket and provided with a pushed portion pushed by one of the moveable members and inserted into an insertion groove of one of the lateral portions of the slide body, and a braking pad mounted to one side, toward the rail groove, of the support block. By this way, the braking pad is convenient to be replaced, and the support block can be adjusted in height according to the rails with different specifications.

Preferably, each of the second pistons has a receiving slot at one side toward the partition wall thereof for receiving of a sound absorbing material. The sound absorbing material is used to eliminate the abnormal noises generated when the second piston hits the partition wall.

Preferably, each of the lateral portions of the slide body has an end opening communicating with the second chamber. A spring cover is assembled with each of the lateral portions of the slide body to cover the end opening and bear one end of the elastic member.

Preferably, the periphery wall of the end opening has an annular groove and a notch axially communicating with the annular groove. The outer periphery of the spring cover has a flange inserted into the annular groove through the notch. When the spring cover is turned until the flange is staggered to the notch, the assembly of the spring cover is completed.

Preferably, each of the lateral portions of the slide body has a pin hole adjacent to the end opening, and each of the spring covers has a positioning concave portion at the outer periphery thereof. A pin is inserted in the pin hole and engaged with the positioning concave portion for preventing the spring cover from being accidentally turned to open.

Preferably, a fixture is provided to include a bearing plate, a threaded rod, and a nut. When in use, the bearing plate is screwed to the outer end surface of the spring cover, and then the threaded rod is inserted into a center hole of the bearing plate and a shaft hole of the spring cover and engaged with the rod portion of the first piston, and finally the nut is screwed to the threaded rod and pushes against the bearing plate. Now the spring cover can be turned to open. When the spring cover is open, it is ejected by the restoring force of the elastic member, and meanwhile the bearing plate and the nut can bear the restoring force applied to the spring cover together for preventing people from damage by the ejected spring cover, thereby enhancing safety of operation.

Preferably, each of the fluid pressure cylinders has a cylinder body disposed at the end surface of one of the lateral portions of the slide body, a third piston movably disposed in the cylinder body to divide the inside of the cylinder body into a third chamber and a fourth chamber, and a piston rod provided with one end connected with the third piston and the other end inserted into one of the first chambers of the slide body and abutted against the head portion of one of the first pistons. By this way, when the third piston is pushed by the fluid pressure force, the third piston pushes against the head portion of the first piston through the piston rod, such that the first piston is moved toward the partition wall.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1, 2, 6 and 7, a clamp slide 10 of the present invention comprises a slide body 20, two piston units 39, two elastic members 45, two fluid pressure cylinders 50, and two braking units 60.

Figure 1:
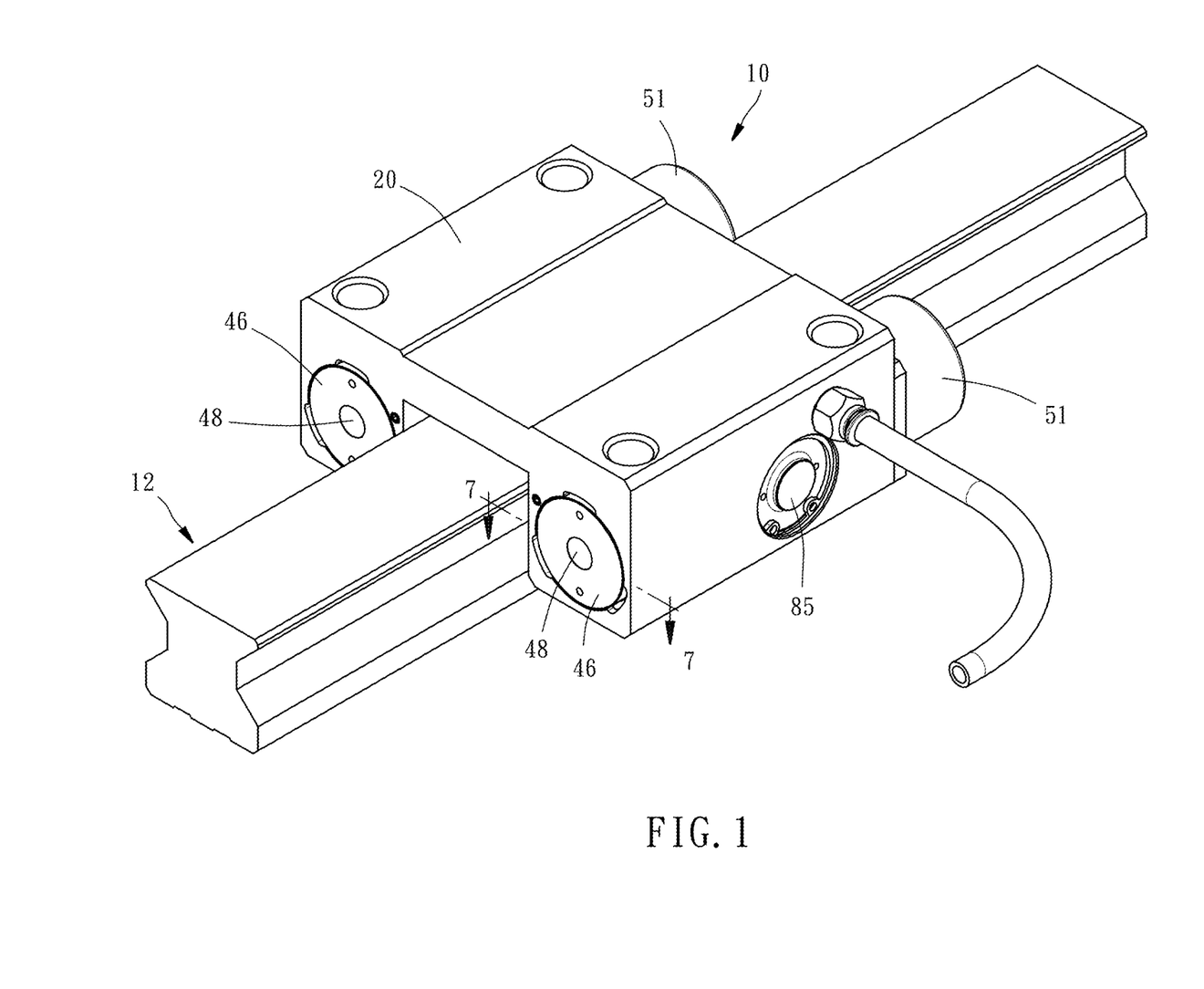
FIG. 1 is a perspective view of a clamp slide of the present invention, in which the clamp slide is assembled with a rail.
Figure 2:
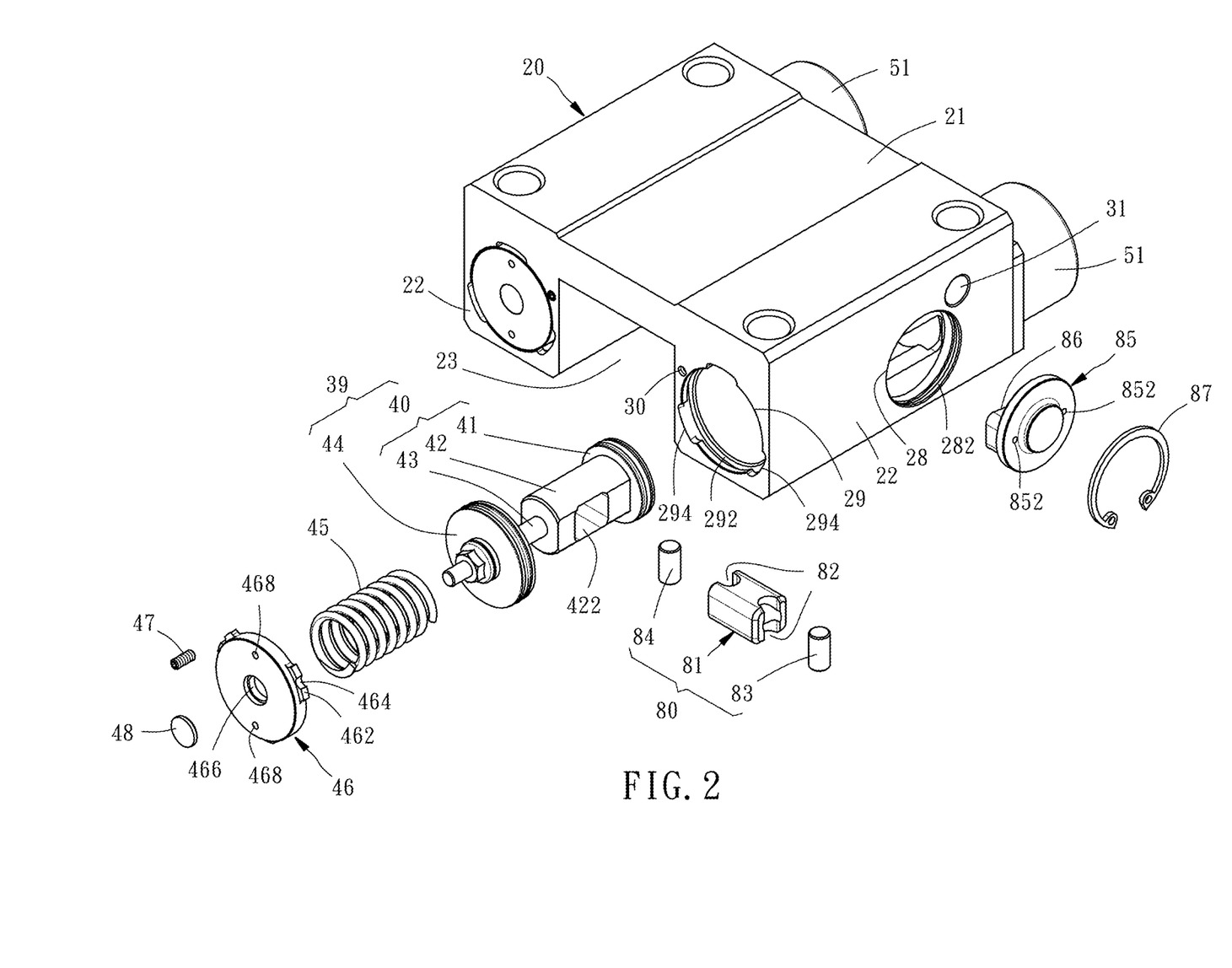
FIG. 2 is a partially exploded perspective view of the clamp slide of the present invention.
Figure 4:
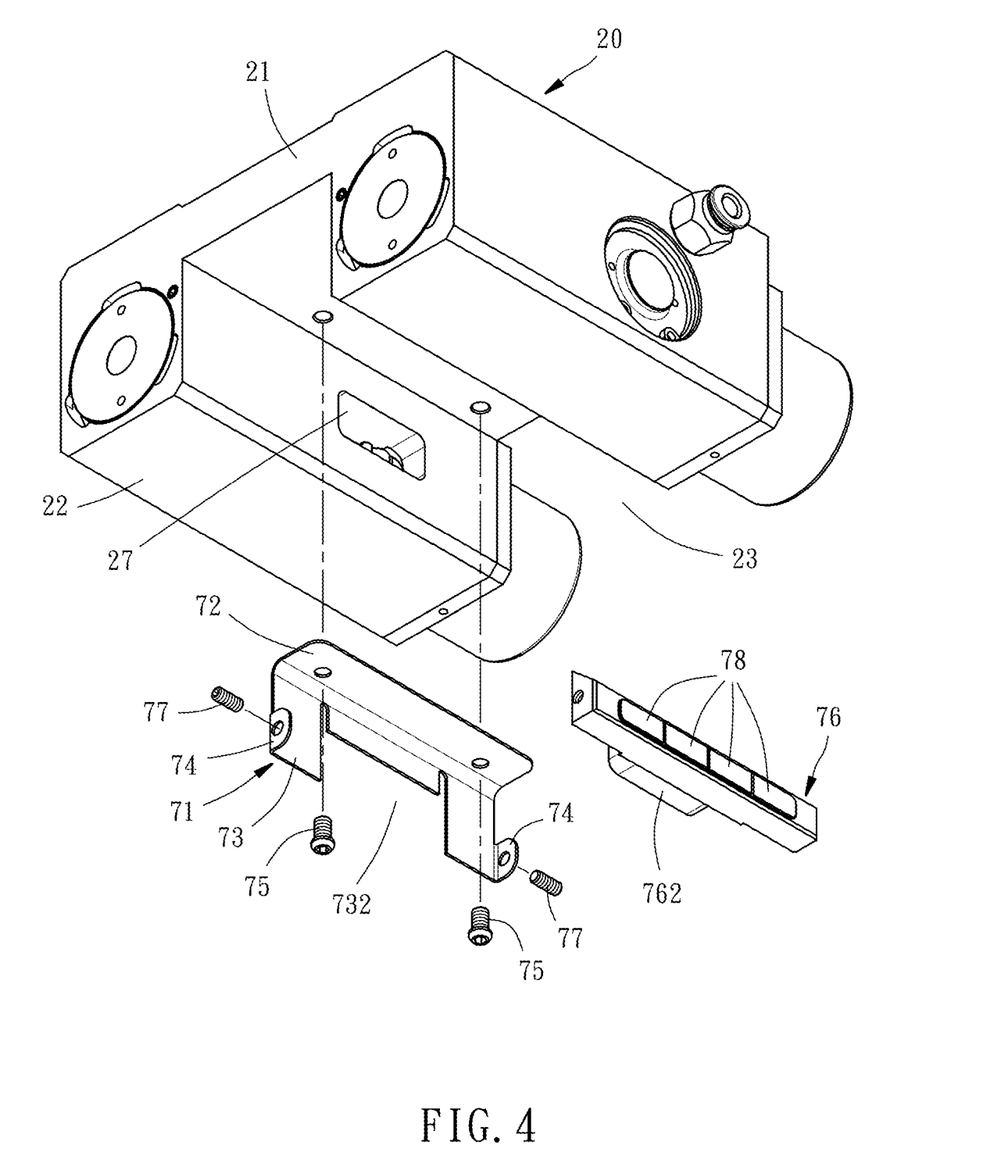
FIG. 4 is a partially exploded perspective view of FIG. 3.
Figure 6:
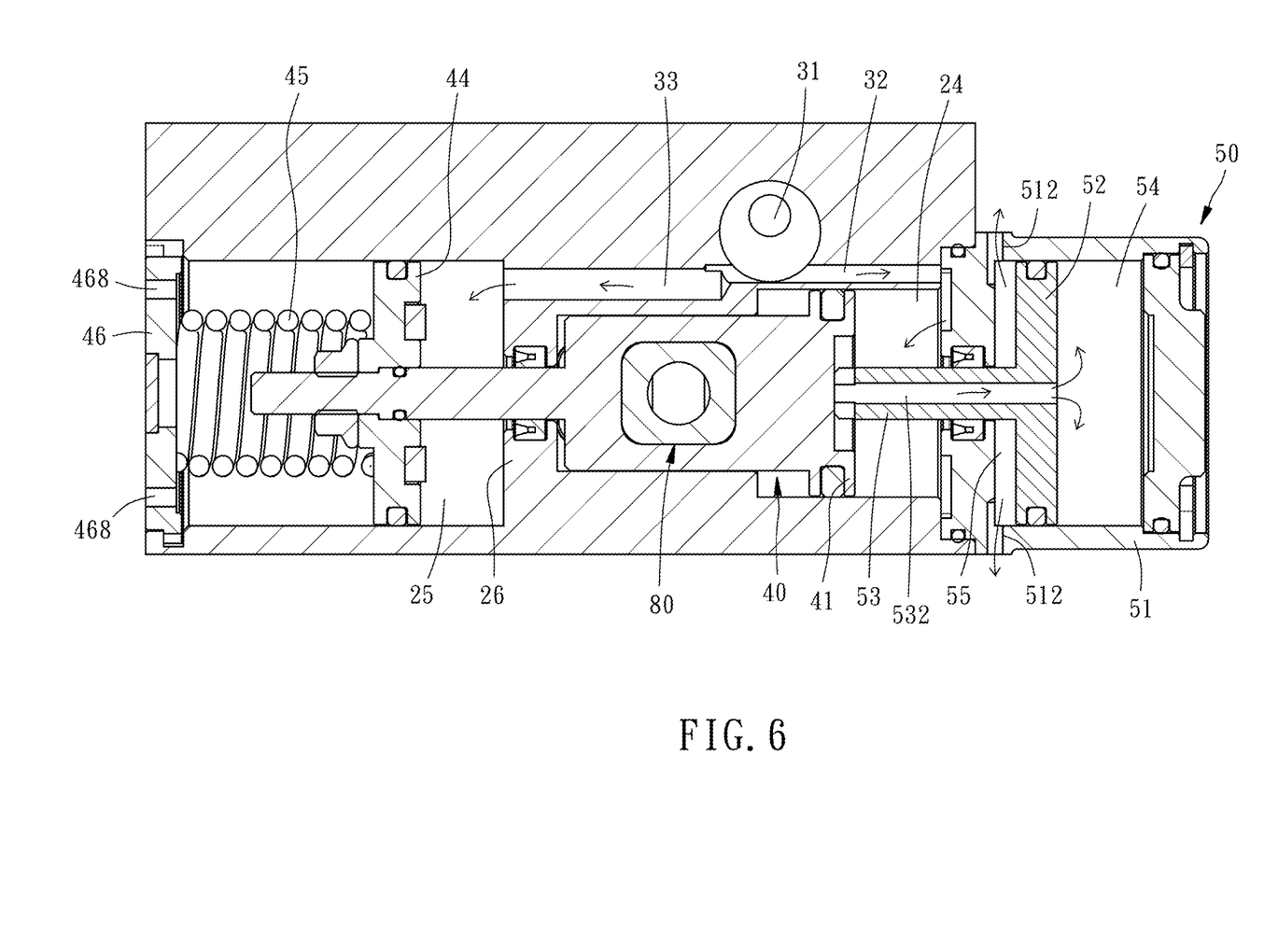
FIG. 6 is a sectional view taken along line 6-6 of FIG. 5.

The slide body 20 has a top portion 21 and two lateral portions 22 arranged in a left and right manner. The top portion 21 is connected with the lateral portions 22 to form a rail groove 23 fitted to a rail 12. As shown in FIG. 6, each of the lateral portions 21 has a first chamber 24 and a second chamber 25 therein. The first chamber 24 and the second chamber 25 are separated from each other by a partition wall 26. As shown in FIGS. 2 and 4, the inner surface of each of the lateral portions 21 (i.e., the surface toward the rail groove 23) has an insertion groove 27 communicating with the first chamber 24, and the outer surface of each of the lateral portions 21 (i.e., the surface back to the rail groove 23) has a lateral hole 28 communicating with the second chamber 25. The periphery wall of the lateral hole 28 has a fastening groove 282. The front end surface of each of the lateral portions 21 has an end opening 29 communicating with the second chamber 25 and a pin hole 30 adjacent to the end opening 29. The periphery wall of the end opening 29 has an annular groove 292 and three notches 294 axially communicating with the annular groove 292. Further, as shown in FIGS. 2 and 6, each of the lateral portions 22 has an air inlet 31, three first channels 32 (for illustrative purposes, FIG. 6 only shows one first air channel), and a second air channel 33. Two ends of the first channels 32 communicate with the air inlet 31 and the first chamber 24, respectively. Two ends of the second channel 33 communicate with one of the first channels 32 and the second chamber 25, respectively.

Figure 8:
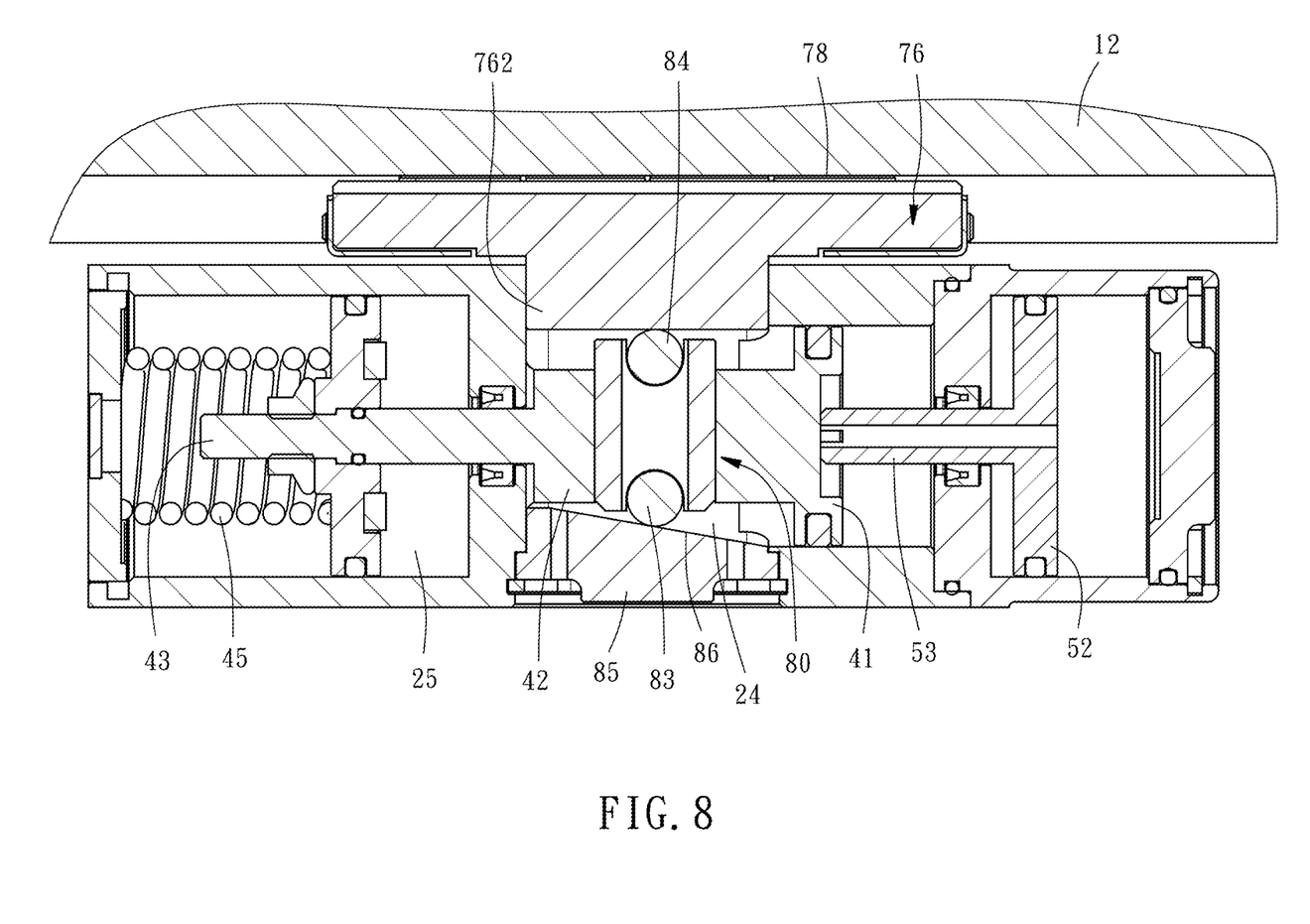
FIG. 8 is similar to FIG. 7, showing the lateral cover is assembled in the first state, and the rail is clamped by the braking members.

Each of the piston units 39 includes a first piston 40 and a second piston 44. As shown in FIGS. 2 and 8, the first piston 40 is disposed in one of the first chambers 24 and has a head portion 41, and a body portion 42 connected with the head portion 41 and provided with a transverse hole 422, and a rod portion 43 connected with the body portion 42 and passing through the partition wall 26 and having a part located in one of the second chambers 25. The second piston 44 is disposed in one of the second chambers 25 and fixedly connected with the rod portion 43 of the first piston 40, such that the second piston 44 is moved synchronously along with the first piston 40.

Figure 5:
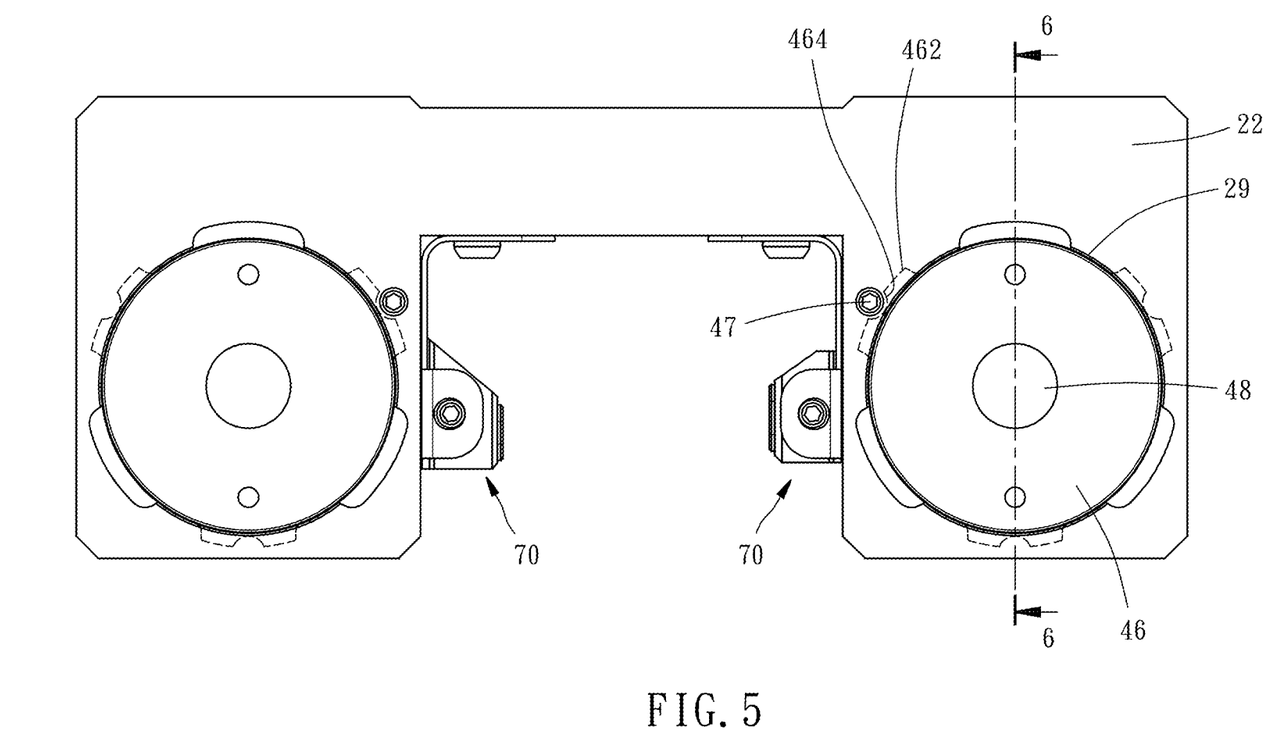
FIG. 5 is an end view of the clamp slide of the present invention.

Each of the elastic members 45 is embodied as a compression spring and disposed in one of the second chambers 25 and sleeved on a distal end of the rod portion 43 of the first piston 40. Each of the elastic members 45 has one end abutted against the second piston 44 and the other end abutted against a spring cover 46. As shown in FIGS. 2 and 5, the outer periphery of the spring cover 46 has three flanges 462 inserted into the annular groove 292 through the three notches 294. When the spring cover 46 is turned until the three flanges 462 are staggered to the three notches 294, the spring cover 46 is assembled with the slide body 20 to cover the end opening 29. In order to prevent the spring cover 46 from being accidentally turned to open, a pin 47 is inserted into the pin hole 30 and engaged with a positioning concave portion 464 of one of the flanges 462 of the spring cover 46 so as to provide positioning effect to the spring cover 46. Further, the spring cover 46 has a shaft hole 466 at a center thereof blocked by a plug 48, and two second air outlets 468 communicating with the second chamber 25 and arranged at the top and bottom of the shaft hole 466.

As shown in FIG. 6, each of the fluid pressure cylinders 50 includes a cylinder body 51 disposed at the rear end surface of one of the lateral portions 22 of the slide body 20, a third piston 52 movably disposed in the cylinder body 51 to divide the inside of the cylinder body 51 into a third chamber 54 and a fourth chamber 55, and a piston rod 53 having one end connected with the third piston 52 and the other end inserted into the first chamber 24 of the slide body 20 and abutted against the head portion 41 of the first piston 40. Further, the piston rod 53 has a third air channel 532 extending along the axial direction thereof and provided with two ends thereof communicating with the first chamber 24 and the third chamber 54.

Figure 3:
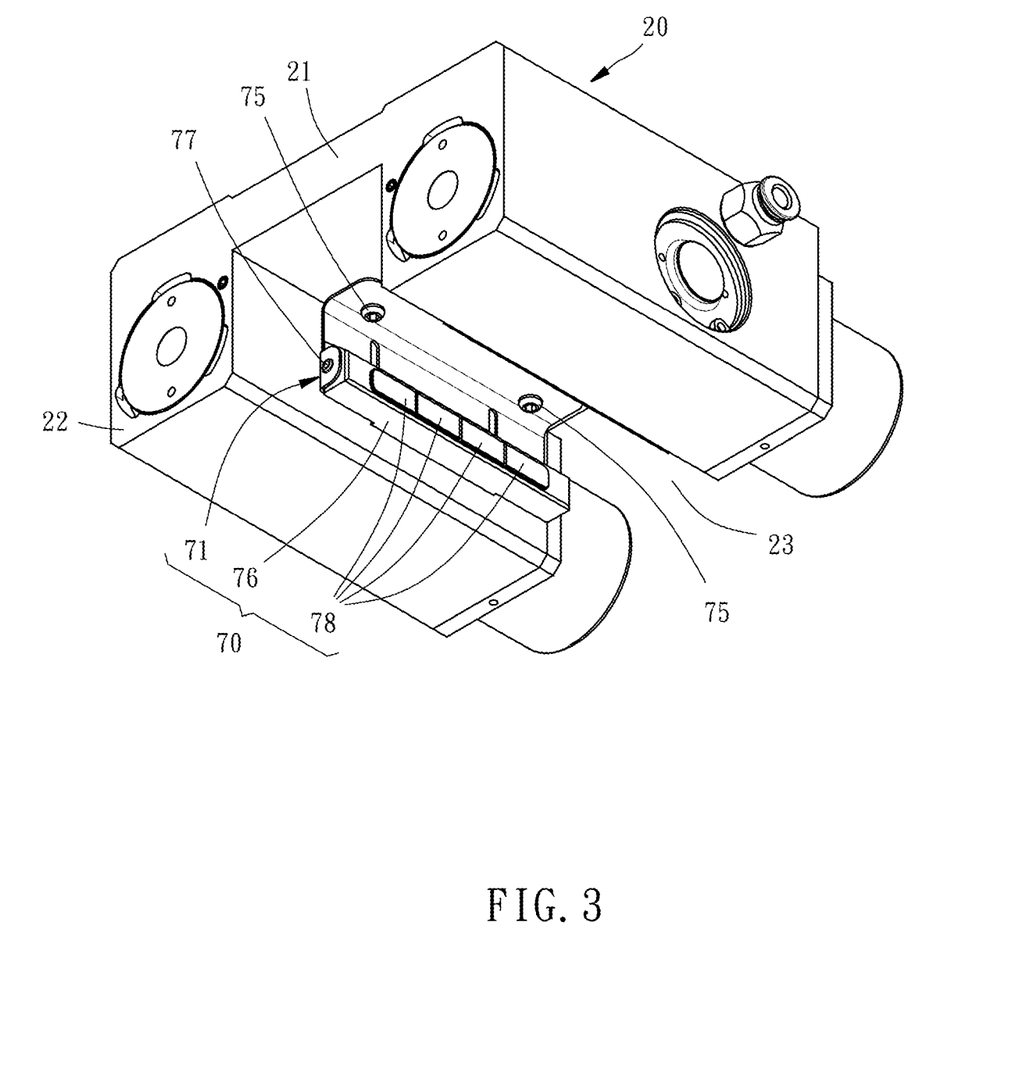
FIG. 3 is a bottom perspective view of the clamp slide of the present invention.
Figure 7:
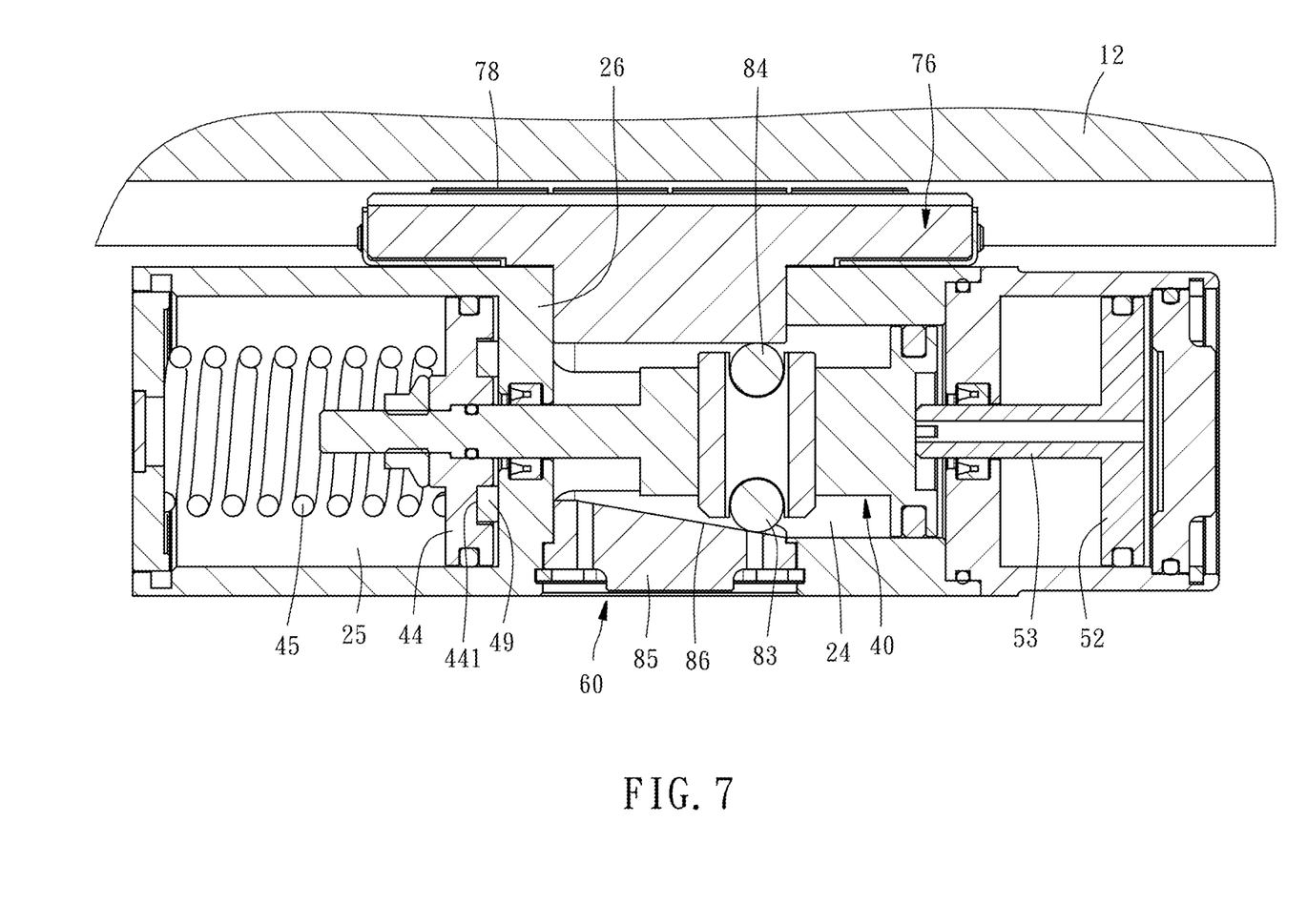
FIG. 7 is a sectional view taken line 7-7 of FIG. 1, showing the lateral cover is assembled in a first state, and the rail is released from the braking members.

As shown in FIGS. 2, 3, and 7, each of the braking members 60 includes a braking member 70, a moveable member 80, and a lateral cover 85.

The braking member 70 has a metal bracket 71, a support block 76, and a plurality of braking pads 78 (the braking pads 78 are, but not limited to, four in number). As shown in FIGS. 3 and 4, the metal bracket 71 has a top plate 72 mounted to the bottom side of the top portion 21 of the slide body 20 by using two screws 75, a straight plate 73 integrally and vertically connected with the top plate 72 and provided with a mouth 732, and two wing sheets 74 integrally and vertically connected with the front and rear sides of the straight plate 73. The support block 76 is made of soft material, such as rubber, and mounted to the wing sheets 74 of the metal bracket 71 by using two screws 77, such that the support block 76 can be adjusted in height according to the rails 12 with different specifications. Further, the outer surface of the support block 76 has a pushed portion 762 inserted into the mouth 732 of the straight plate 73 and the insertion groove 27 of one of the lateral portions 22 of the slide body 20. The braking pads 78 are fixedly connected with the inner side (i.e., the side toward the rail groove 23) of the support block 76 in a side-by-side manner.

As shown in FIGS. 2 and 8, each of the movable members 80 is disposed in the transverse hole 422 of the body portion 42 of the first piston 40, and includes a holder 81 and two rolling members 83, 84 (the rolling members 83, 84 are embodied as, but not limited to, rollers). The holder 81 has two holding slots 82 at two ends thereof, and the rolling members 83, 84 are received in the holding slots 82 and partially protruding out of two ends of the holder 81.

As shown in FIG. 2, each of the lateral covers 85 is fastened to the lateral hole 28 of one of the lateral portions 22 of the slide body 20 by using a fastener 84 engaged with the fastening groove 282 for preventing falling-off of the lateral cover 85. As shown in FIG. 8, each of the lateral covers 85 has an inclined plane 86 abutted against rolling member 83 of the moveable member 80. When the inclined plane 86 of the lateral cover 85 pushes the rolling member 83 of the moveable member 80, the rolling member 84 of the moveable member 80 pushes the pushed portion 762 of the support block 76 so as to enable the braking pads 78 to make contact with the rail 12.

Figure 9:
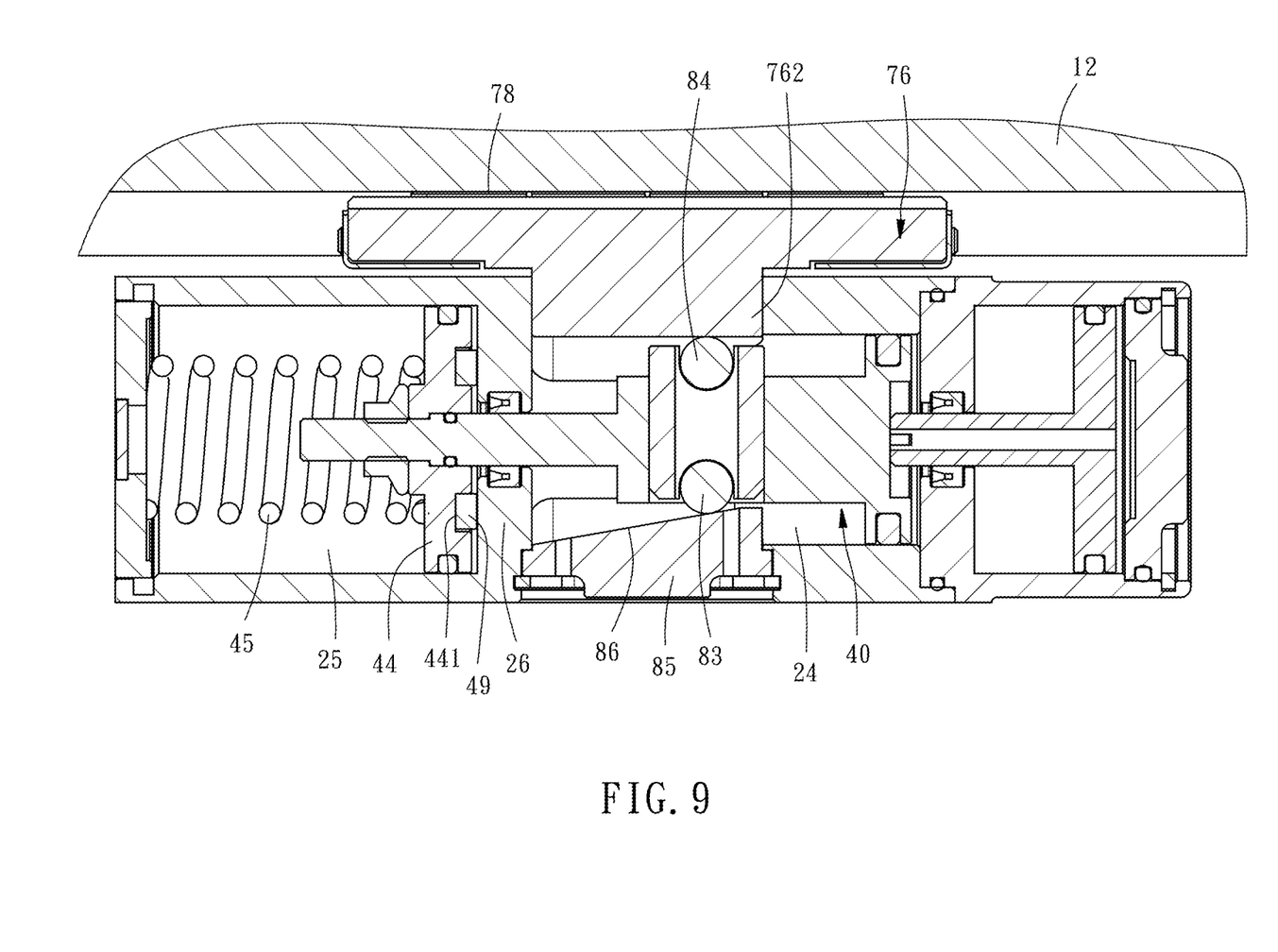
FIG. 9 is similar to FIG. 8, showing the lateral cover is assembled in a second state, and the rail is clamped by the braking members.
Figure 10:
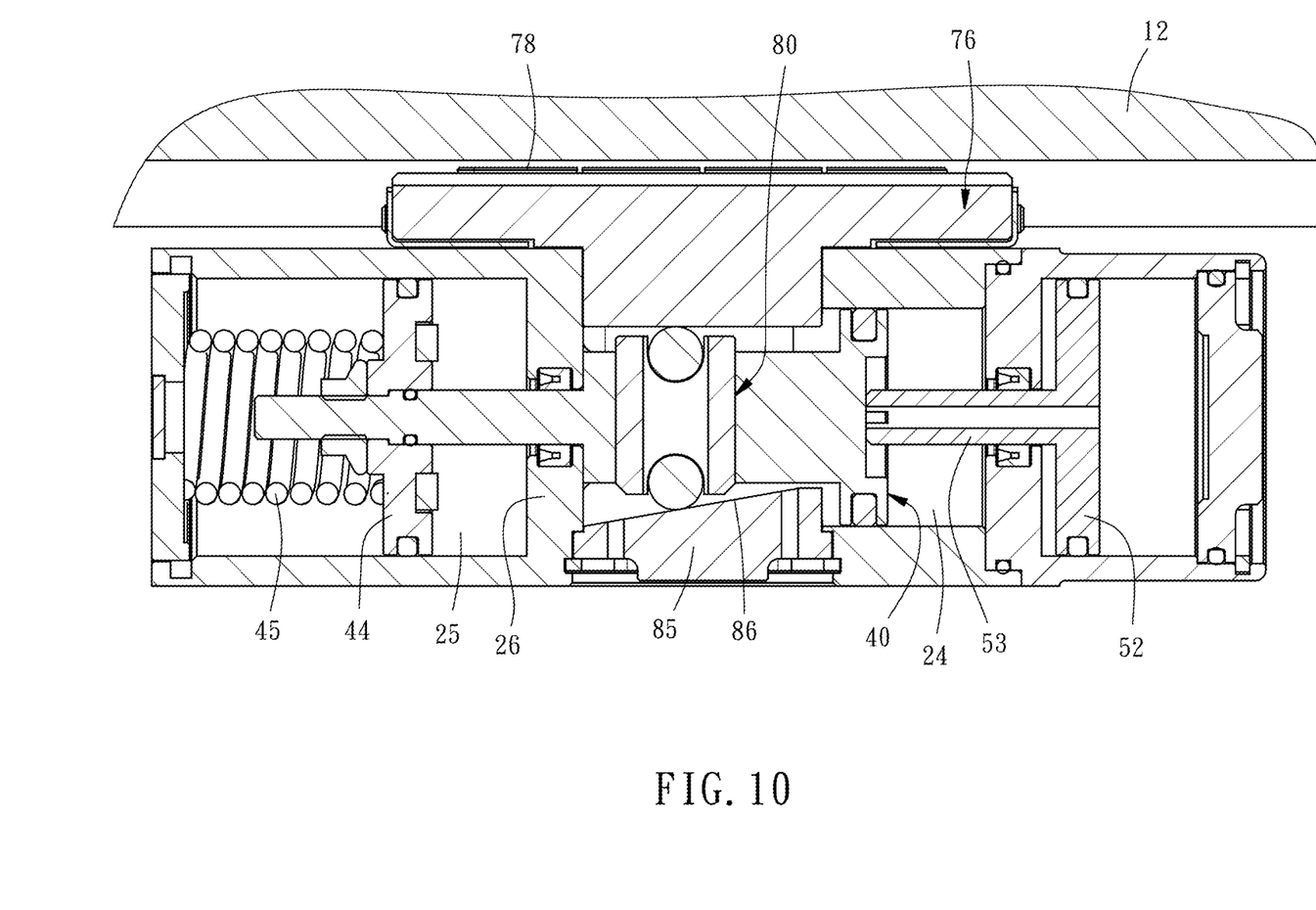
FIG. 10 is similar to FIG. 9, showing the lateral cover is assembled in the second state, and the rail is released from the braking members.

Further, the lateral cover 85 is detachably assembled with the slide body 20 to cover the lateral hole 28, so the lateral cover 85 can be disassembled from the slide body by removing the fastener 87 from the fastening groove 282. As such, the lateral cover 85 can be changed in assembly direction to meet different requirements. As shown in FIGS. 7 and 8, when the lateral cover 85 is attached to the lateral hole 28 in a first state S1, a distance between the inclined plane 86 of the lateral cover 85 and the rail 12 is decreased gradually toward a direction in which the piston unit 50 is pushed by the fluid pressure cylinder 39. As shown in FIGS. 9 and 10, when the lateral cover 85 is attached to the lateral hole 85 in a second state S2, the distance between the inclined plane 86 of the lateral cover 85 and the rail 12 is increased gradually toward a direction in which the piston unit 39 is pushed by the fluid pressure cylinder 50.

FIGS. 7 and 8 show that the clamp slide 10 is operated under the first state S1 that the lateral cover 85 is assembled. When the high-pressure air is injected into the air inlet 31, as shown in FIG. 6, it flows into the first chamber 24 via the first air channel 32, and then flows into the third channel 532 from the first chamber 24, and finally flows into the third chamber 54 via the third channel 532. As such, the third piston 52 is pushed to push the first piston 40 through the piston rod 53, so the movable member 80 is moved by the first piston 40 toward the partition wall 26, and meanwhile, the air stored in the fourth chamber 55 is extruded by the third piston 52 and exhausted to the outsides via two third air outlets 512 of the cylinder body 51. On the other hand, the high-pressure air flows into the second chamber 25 via the second air channel 33 to push the second piston 44. The air stored in the second chamber 25 is exhausted to the outsides via two second air outlets 468 of the spring cover 46. Therefore, the first piston 40 is driven to move toward the partition wall 26, and the elastic member 45 is compressed to store energy.

Further, during the movement of the first piston 40, as shown in FIG. 8, since the distance between the inclined plane 86 of the lateral cover 85 and the rail 12 is decreased gradually toward a direction in which the piston unit 50 is pushed by the fluid pressure cylinder 39, the rolling member 83 is pushed by the inclined plane 86 so as to enable the moveable member 80 to move along the inclined plane 86. During the movement of the moveable member 80, the rolling member 84 pushes the pushed portion 762 of the support block 76. Because the support block 76 are fastened to the wing sheets 76 of the metal bracket 71 (as shown in FIGS. 3 and 4), and the top plate 72 of the metal bracket 71 is fastened to the top portion 21 of the slide body 20, the straight plate 73 and the wing sheets 74 are slightly elastically deformed due to the metal characteristic. Therefore, the braking pads 78 can make contact with the rail 12 to generate a braking effect.

When the air injection is stopped, as shown in FIG. 7, the second piston 44 is pushed by the restoring force generated by the elastic member 45 to enable the first piston 40 to be moved along with the second piston 44, such that the first piston 40 pushes the third piston 52 through the piston rod 53. The air stored in the first chamber 24 is exhausted to the outsides via two first air outlets 852 of the lateral cover 85, and the air stored in the third chamber 54 flows into the first chamber 24 via the third channel 532, and then exhausted to the outsides via the first air outlets 852 of the lateral cover 85. Further, during the opposite movement of the first piston 40, the moveable member 80 is moved along with the first piston 40 to allow the rolling member 83 not to be pushed by the inclined plane 85, such that the rolling member 84 releases the pushing force applied to the support block 76. As such, the support block 76 is rebounded along with the straight plate 73 to drive the braking pads 78 to release the rail 12.

FIGS. 9 and 10 show that the clamp slide 10 is operated under the second state S2 that the lateral cover 85 is assembled. Since the distance between the inclined plane 86 of the lateral cover 85 and the rail 12 is increased gradually toward a direction in which the piston unit 50 is pushed by the fluid pressure cylinder 39, as shown in FIG. 9, the second piston 44 is pushed by the elastic member 45 to drive the first piston 40 to move away from the partition wall 26 when the air injection is stopped, such that the rolling member 83 is pushed by the inclined plane 86 of the lateral cover 85, and therefore the rolling member 84 pushes the pushed portion 762 of the support block 76. By this way, the braking pads 78 can make contact with the rail 12 to generate a braking effect. However, when the high-pressure air is injected into the air inlet 31, as shown in FIG. 10, the third piston 52 pushes the first piston 40 through the piston rod 53 to drive the first piston 40 and the moveable member 80 to move synchronously toward the partition wall 26. During the movement of the first piston 40, the distance between the inclined plane 86 of the lateral cover 85 and the rail 12 is increased gradually toward a direction in which the piston unit 50 is pushed by the fluid pressure cylinder 39, so the pushing force applied by the inclined plane 86 to the rolling member 83 is decreased gradually, and therefore the pushing force applied by the rolling member 84 to the support block 76 is decreased gradually. As such, the support block 76 is rebounded along with the straight plate 73 to drive the braking pads 78 to release the rail 12.

That is to say, when the lateral cover 85 is assembled in the first state S1 as shown in FIGS. 7 and 8, the clamping force is generated when the high-pressure air is injected, and the clamping force is released when the air injection is stopped. When the lateral cover 85 is assembled in the second state S2 as shown in FIGS. 9 and 10, the clamping force is released when the high-pressure air is injected, and the clamping force is generated when the air injection is stopped. Further, during the reciprocate movement of the second piston 44, an abnormal noise may be caused by contact between the second piston 44 and the partition wall 26. As shown in FIGS. 7 and 9, a sound absorbing material 49 made of Polyurethane is provided in a receiving slot 441 formed at one side toward the partition wall 26 of the second piston 44 to make contact with the partition wall 26, thereby eliminating the abnormal noise that occur when the second piston 44 hits the partition wall 26.

As indicated above, the clamp slide 10 of the present invention allows the inclined planes 86 to perform different tilt direction by means of changing the lateral cover 85 in two different states for meeting different requirements, such that the number of components can be reduced to simplify structure and reduce manufacturing cost.

Figure 11:
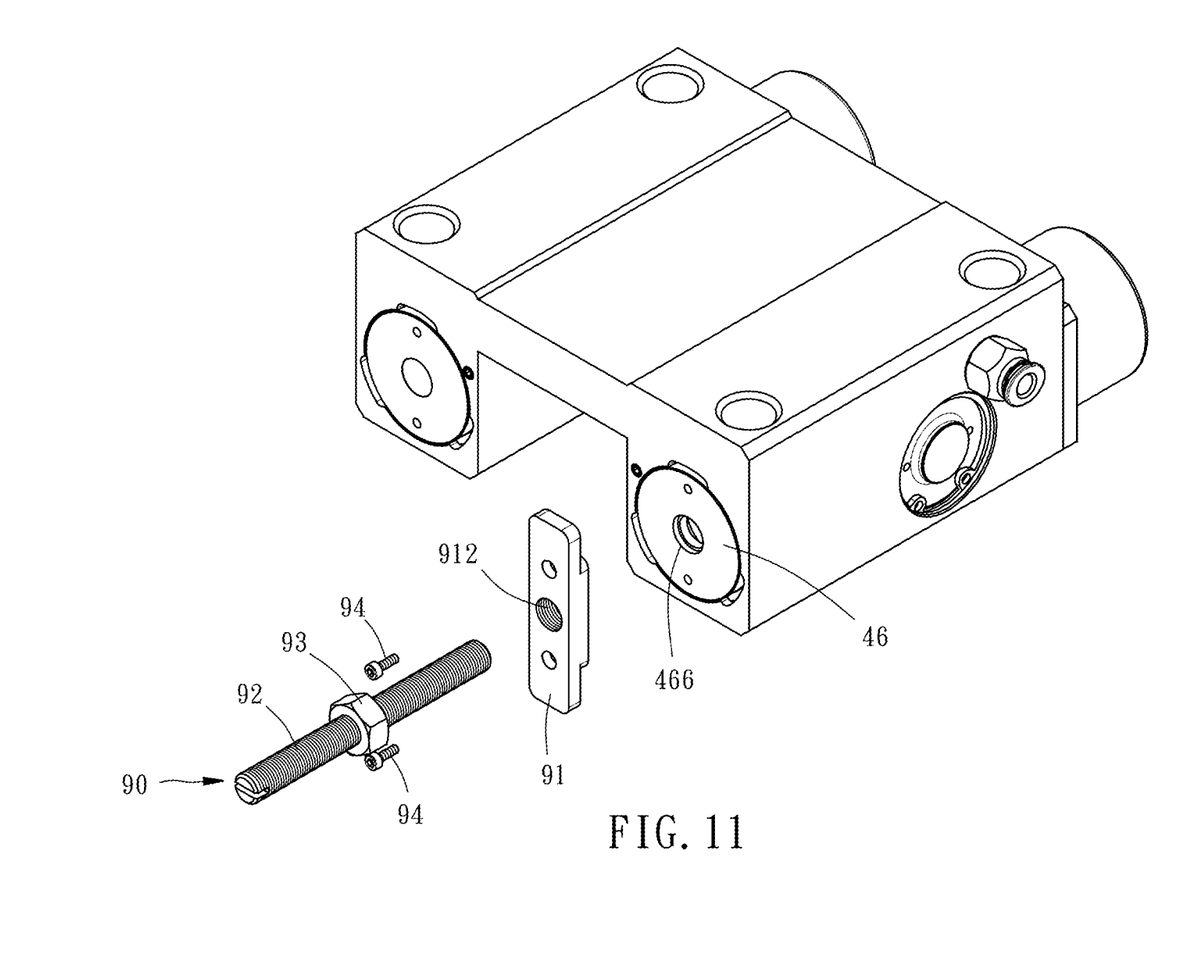
FIG. 11 is a perspective view of the clamp slide of the present invention, in which the fixture is not assembled with the spring cover.
Figure 12:
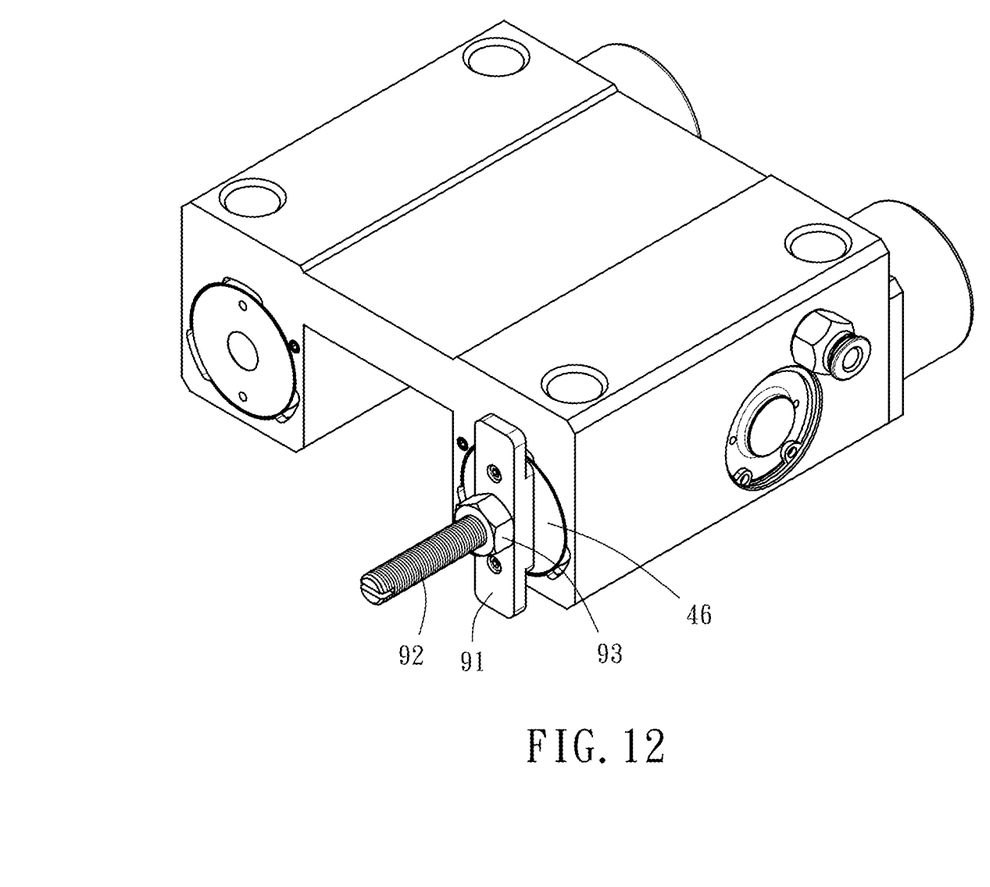
FIG. 12 is similar to FIG. 11, showing the fixture is assembled with the spring cover.
Figure 13:
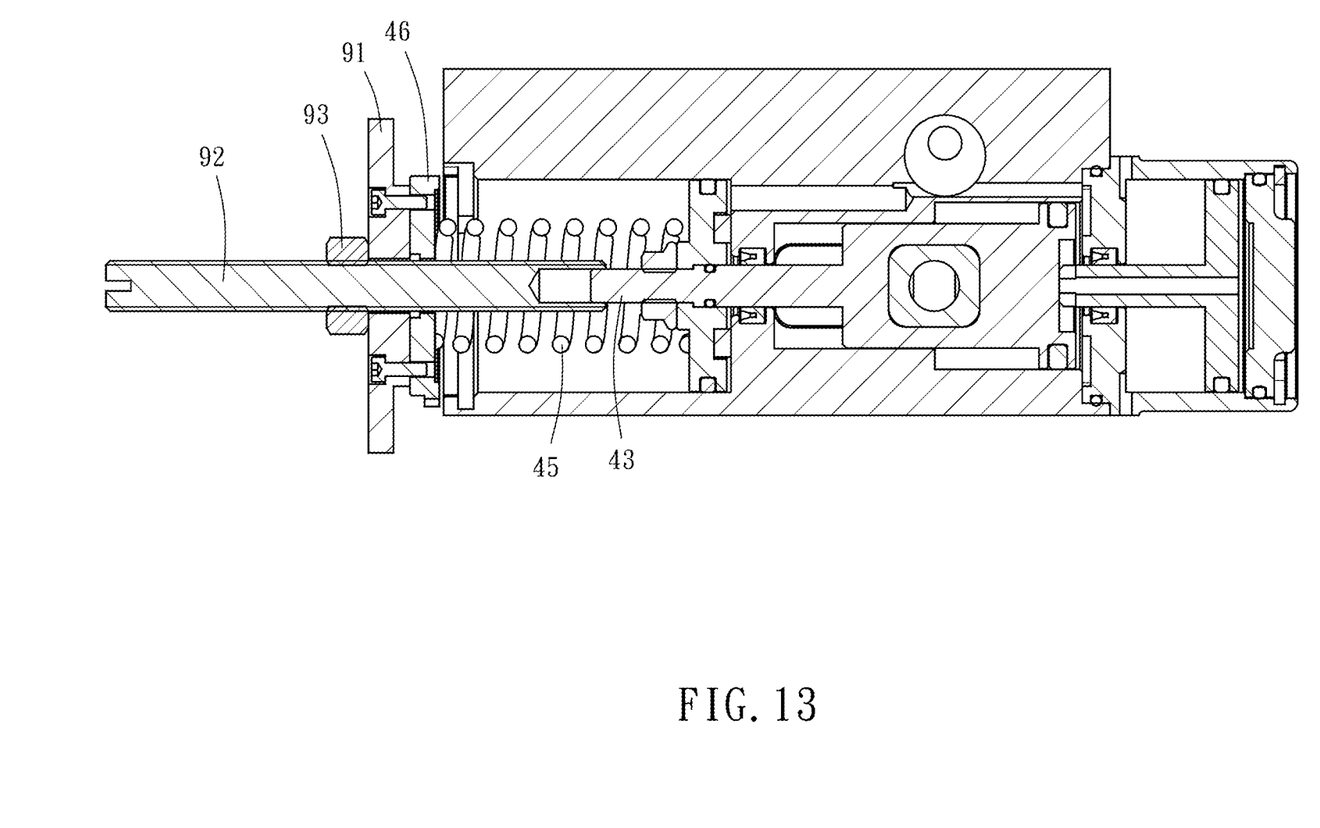
FIG. 13 is a sectional view of the clamp slide of the present invention, showing the spring cover is disassembled.

In addition, the present invention further provides a fixture 90 that is used to easily replace the elastic member 45 if necessary. The fixture 90 includes a bearing plate 91, a threaded rod 92, and a nut 93. When in use, as shown in FIGS. 11 to 13, the plug 48 is removed from the spring cover 46 first, and then the bearing plate 91 is screwed to the outer end surface of the spring cover 46 by using two screws 94, and then the threaded rod 92 is screwed to a center hole 912 of the bearing plate 91 and inserted into the shaft hole 466 of the spring cover 46 until the distal end of the threaded rod 92 is engaged with the rod portion 43 of the first piston 40, and finally the nut 93 is screwed to the threaded rod 92 until the nut 93 presses against the bearing plate 91. Now the spring cover 46 can be turned to open. When the spring cover 46 is open, it will be ejected by the restoring force of the elastic member 45. If there is no protection at all, the ejected spring cover 46 may damage people around it. Therefore, the bearing plate 91 and the nut 93 can bear the restoring force applied to the spring cover 46 together, such that the spring cover 46 can be easily removed to replace the elastic member 45, thereby enhancing safety of operation.

After the replacement of the elastic member 45 is completed, the threaded rod 92 is inserted into the elastic member 45 and engaged with the rod portion 43 of the first piston 40, and then the spring cover 46 is abutted against one end of the elastic member 45. Next, the nut 93 is driven to move along the threaded rod 92 to push the bearing plate 91, and therefore the spring cover 46 is pushed by the bearing plate 91 to compress the elastic member 45 until the spring cover 46 is fixed to the end opening 29. Finally, the pin 47 is installed to complete the assembly of the spring cover 46.

What is claimed is:

1. A clamp slide for use in a linear guide having a rail, the clamp slide comprising:
    a slide body having two opposite lateral portions and a top portion connected with the lateral portions to form a rail groove fitted to the rail, each of the lateral portions having a lateral hole at one side thereof back to the rail groove;
    two piston units movably disposed in the lateral portions of the slide body and each having a transverse hole;
    two elastic members disposed in the lateral portions of the slide body and stopped against the piston units;
    two fluid pressure cylinders disposed at end surfaces of the lateral portions of the slide body for providing hydraulic pressure forces to push the piston units to move toward a direction against restoring forces exerted by the elastic members; and
    two braking units each having a braking member disposed at one side, toward the rail groove, of one of the lateral portions of the slide body, a movable member movably disposed in the transverse hole of one of the piston units, and a lateral cover disposed at the lateral hole of one of the lateral portions of the slide body and provided with an inclined plane abutted against one of the movable members for enabling the movable member to push the braking member, such that the rail is clamped by the braking members, wherein when the lateral cover is assembled with one of the lateral holes in a first state, a distance between the inclined plane of the lateral cover and the rail is decreased gradually toward a direction in which the piston unit is pushed by the fluid pressure cylinder, and when the lateral cover is assembled with one of the lateral holes in a second state, the distance between the inclined plane of the lateral cover and the rail is increased gradually toward a direction in which the piston unit is pushed by the fluid pressure cylinder.

2. The clamp slide as claimed in claim 1, wherein each of the lateral portions of the slide body includes a first chamber communicating with one of the lateral holes, a second chamber separated from the first chamber by a partition wall; each of the piston units includes a first piston movably disposed in one of the first chambers of the slide body and having a head portion, a body portion connected with the head portion and provided with the transverse hole, and a rod portion connected with the body portion and passing through one of the partition walls and having a part located in one of the second chambers of the slide body, and a second piston movably disposed in one of the second chambers of the slide body and fixedly connected with the rod portion of the first piston so as to be moved along with the first piston; the elastic members are stopped against the second pistons; the fluid pressure cylinders are stopped against the first pistons.

3. The clamp slide as claimed in claim 1, wherein the moveable members each have a holder provided with two holding slots at two ends thereof, and two rolling members received in the holding slots and partially protruding out of two ends of the holder; when one of the rolling members is pushed by the inclined plane of one of the lateral covers, the other of the rolling members pushes against one of the braking members.

4. The clamp slide as claimed in claim 1, wherein the braking members each have a metal bracket mounted to a bottom side of the top portion of the slide body, a support block mounted to the metal bracket and provided with a pushed portion pushed by one of the moveable members and inserted into an insertion groove of one of the lateral portions of the slide body, and a braking pad mounted to one side, toward the rail groove, of the support block.

5. The clamp slide as claimed in claim 2, wherein each of the second pistons has a receiving slot at one side toward the partition wall thereof for receiving of a sound absorbing material.

6. The clamp slide as claimed in claim 2, wherein each of the lateral portions of the slide body has an end opening communicating with the second chamber and provided with an annular groove and a notch axially communicating with the annular groove at a periphery wall thereof, a spring cover has a flange at an outer periphery thereof inserted into the annular groove through the notch, such that the spring cover is fixed to the end opening when the flange and the notch are staggered to each other.

7. The clamp slide as claimed in claim 6, wherein each of the lateral portions of the slide body further has a pin hole adjacent to the end opening and inserted by a pin engaged with a positioning concave portion provided at the outer periphery of the spring cover.

8. The clamp slide as claimed in claim 6, further comprising a fixture including a bearing plate detachably disposed to an outer end surface of one of the spring covers and provided with a center hole, a threaded rod passing through the center hole of the bearing plate and a shaft hole of one of the spring covers and having a distal end thereof engaged with the rod portion of one of the first pistons, and a nut screwed to the threaded rod and abutted against one side, back to the spring cover, of the bearing plate.

9. The clamp slide as claimed in claim 2, wherein each of the fluid pressure cylinder has a cylinder body disposed at the end surface of one of the lateral portions of the slide body, a third piston movably disposed in the cylinder body to divide the inside of the cylinder body into a third chamber and a fourth chamber, and a piston rod provided with one end connected with the third piston and the other end inserted into one of the first chambers of the slide body and abutted against the head portion of one of the first pistons.

\* \* \* \* \*